United States Patent [19]

Durand et al.

[11] 4,182,521

[45] Jan. 8, 1980

[54] MOTORIZED DELIVERY TRICYCLE

[75] Inventors: Francois Durand; Christian Guillem, both of Antibes, France

[73] Assignee: Institute de Recherches et d'Etudes de Techniques Specifiques, Antibes, France

[21] Appl. No.: 793,763

[22] Filed: May 4, 1977

[30] Foreign Application Priority Data

May 10, 1976 [FR] France ................... 76 14524

[51] Int. Cl.$^2$ ................................................ B62J 11/00
[52] U.S. Cl. .................................. 280/202; 180/210; 224/32 R; 280/282; 280/289 A; 280/43.11; 414/498
[58] Field of Search .................. 280/282, 289 A, 62, 280/179 R, 179 B, 202, 43.11; 296/10, 24 R, 1 A, ; 180/25 R, 26 R; 214/515; 224/30 R, 32 R, 32 A, 31

[56] References Cited

U.S. PATENT DOCUMENTS

| 301,702 | 7/1884 | Fay | 280/202 |
|---|---|---|---|
| 1,774,520 | 9/1930 | Lyford | 296/24 R X |
| 2,459,249 | 1/1949 | Sternad | 224/32 R |
| 3,154,316 | 10/1964 | Göhmann | 280/179 R X |
| 3,458,212 | 7/1969 | Swezy | 280/43.11 |
| 4,032,167 | 6/1977 | Chereda | 296/1 A |

FOREIGN PATENT DOCUMENTS 661309  7/1929  France .................... 180/25 R

Primary Examiner—John P. Silverstrim
Attorney, Agent, or Firm—Young & Thompson

[57] ABSTRACT

A motorized tricycle for deliveries, comprises a load carrying box on the rear of the tricycle between the two rear wheels of the tricycle and extending down below the axis of those wheels. The rear wheels are supported from a crosspiece of the frame of the tricycle which is forward of the box, and the support members extend below the box between the wheels for supporting the box. One of the rear wheels can be driven and in fact can be part of a conventional two-wheeled motorcycle unit with the front wheel removed. The crank of this motorcycle unit can be connected to the pedals of the tricycle. The box is releasably locked in place on its support.

1 Claim, 5 Drawing Figures

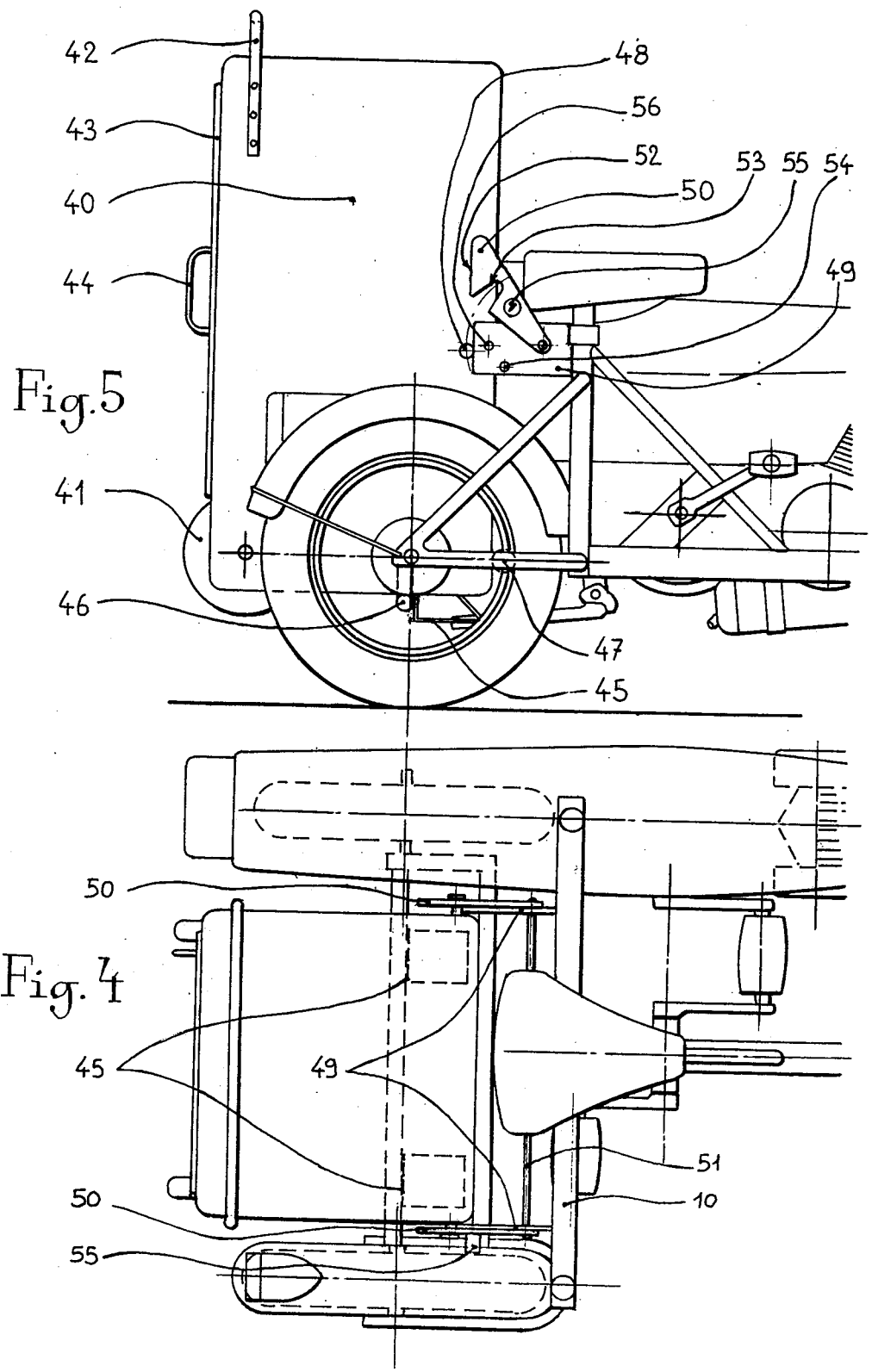

MOTORIZED DELIVERY TRICYCLE

The present invention relates to motorized delivery tricycles, more particularly of the type for the delivery of merchandise in urban areas.

In all urban areas, the transportation and delivery of merchandise weighing of the order of ten to fifty pounds over a radius of, say, ten to twenty miles, poses an extremely frequent problem for a large number of persons and business concerns. The use of automobiles for such deliveries is unsatisfactory in urban areas, not only because of the delays caused by heavy traffic, but also because of the difficulty of finding places to stop so as to make pickups and deliveries, as well as by virtue of the cost.

Cycles and motorcycles are, by contrast, economical and compact; and by means of appropriate load carriers thereon, it is possible to transport relatively light loads. However, operators of bicycles and motorcycles must have a good sense of equilibrium in order to work successfully in this field.

Use of a motorized tricycle provides cheap and compact transportation without the need for the sense of balance required by two-wheeled vehicles. In fact, a number of motorized tricycles are already in existence for the transport of handicapped persons.

Accordingly, it is an object of the present invention to provide a motorized delivery tricycle, which is useful for transportation of even large and relatively heavy loads without damage to the load.

Another object of the present invention is the provision of such a tricycle, which is compact and provides a maximum of carrying space in a minimum of occupied volume.

Finally, it is an object of the present invention to provide such a tricycle, which will be relatively simple and inexpensive to manufacture, easy to operate, maintain and repair, and rugged and durable in use.

Other objects and advantages of the present invention will become apparent from a consideration of the following description, taken in connection with the accompanying drawings, in which:

FIG. 4 is a fragmentary top plan view of a modified form of motorized delivery tricycle according to the present invention; and FIG. 5 is a side elevational view of the structure shown in FIG. 4.

Figure 1:
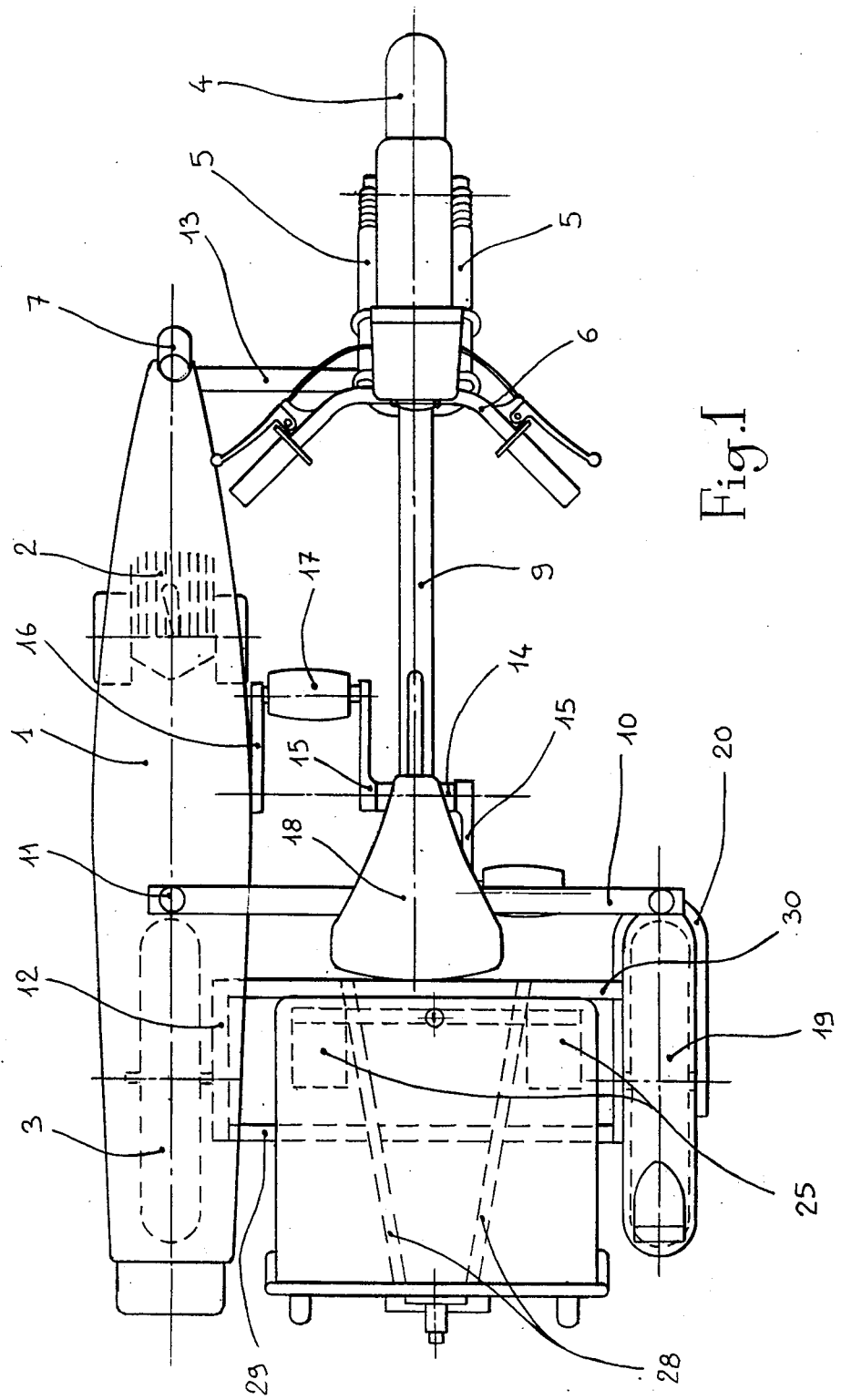
FIG. 1 is a top plan view of a first embodiment of motorized delivery tricycle according to the present invention.
Figure 2:
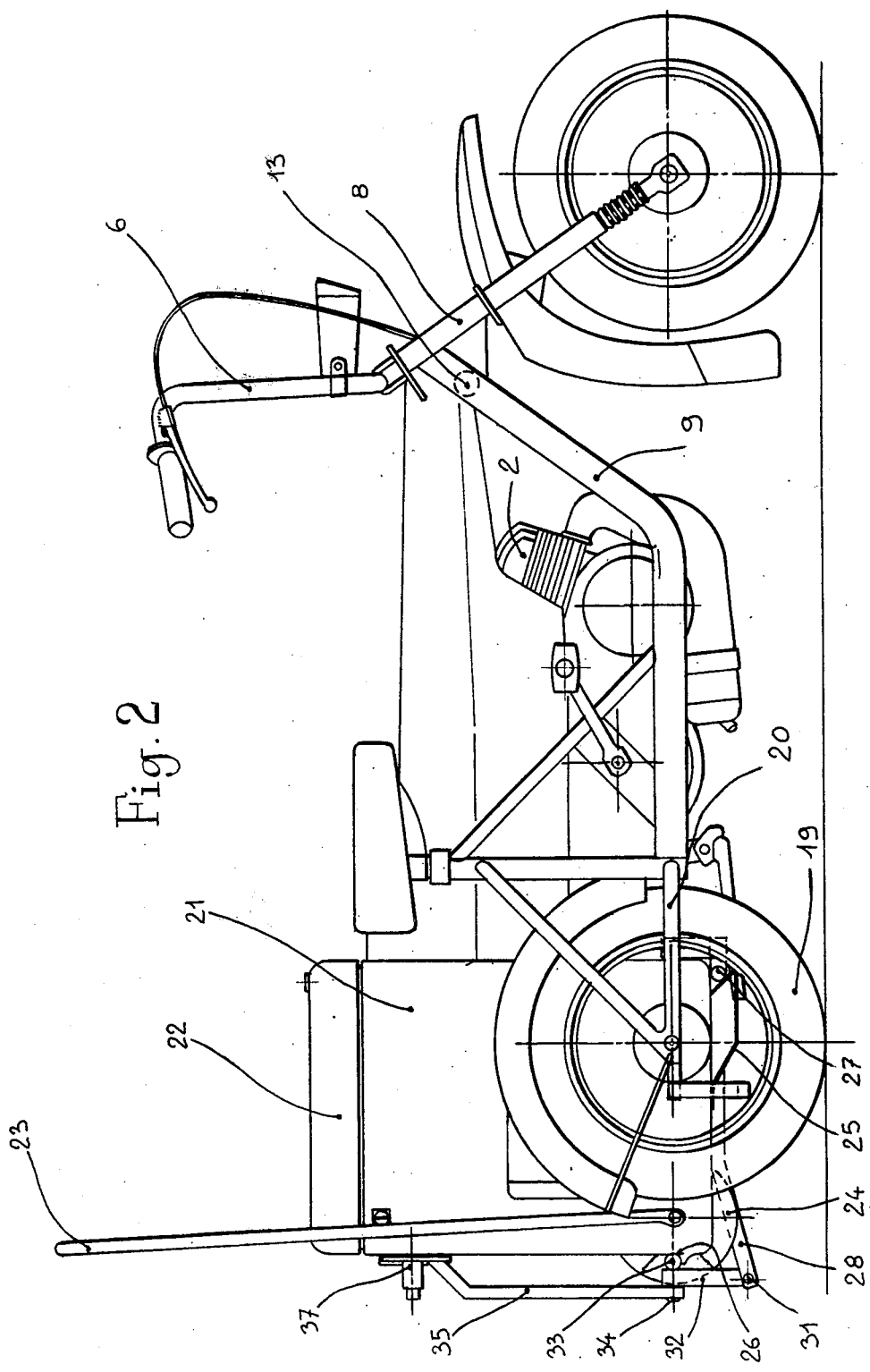
FIG. 2 is a side elevational view thereof.
Figure 3:
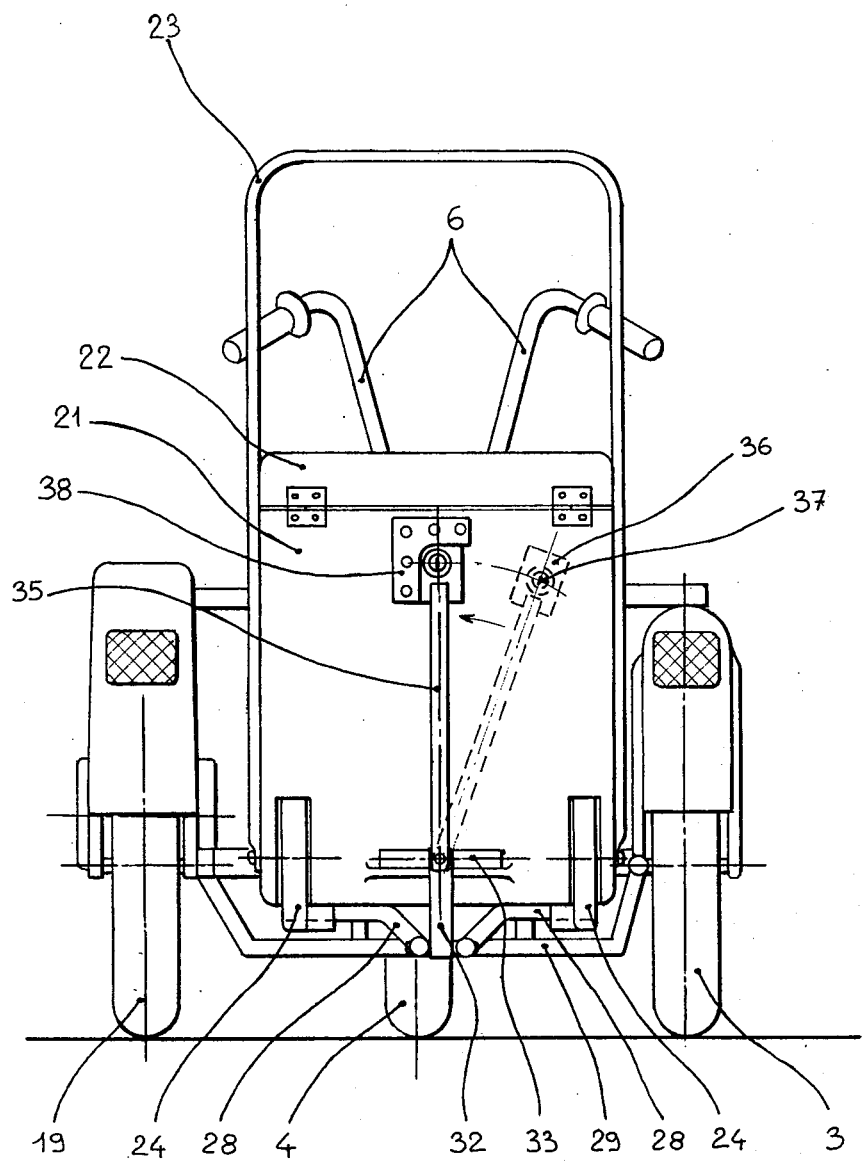
FIG. 3 is a rear elevational view thereof.

Referring now to the drawings in greater detail, and first to the embodiment of FIGS. 1-3, there is shown the body of a conventional motorcycle 1 with its engine 2 and its rear wheel 3 power driven by engine 2. But the forward wheel 4 with its telescopic fork 5 and its handlebars 6 have been removed from the steering pivot 7 of the conventional motorcycle, and instead mounted in the steering guide 8 fixed to the central beam 9 of the tricycle. The angle of the guide 8 is slightly greater than that of pivot 7 to improve the road holding properties of the tricycle. The central beam 9 is fixed to a chassis 10 which is fixed to the conventional motorcycle portion at 11 in a known manner. A crosspiece 13 fixed to central beam 9 is connected to the conventional motorcycle portion via the tube which provides the pivot 7 of the original motorcycle. A pedals journal 14 is fixed to the central beam 9 and is aligned with the pedals journal of the motorcycle 1. The pedal cranks 15 turn in their journal 14 and are connected with the pedal crank 16 of the motorcycle by a pedal 17. It can easily be seen that a passenger seated on the seat 18 can pedal with pedal cranks 15 to drive the pedal crank 16 of the motorcycle and hence the movable portions of the engine 2. The other supporting wheel 19 is carried by fork 20 secured to the chassis 10.

It will also be evident that the seat 18 can be removed and the passenger can be seated on the load box 21. The load box 21 with its cover 22, its chicken bar 23 and its wheels 24, is provided at its lower portion with supports 25 and projection 26. Supports 25 wedge against tube 27 of the chassis 10 which tube thus serves as a load locking element. Box 21 bears also against tubes 28, 29 and 30 of chassis 10. The rear ends of tubes 28 provide a bearing for axle 31 of lever 32 whose abutment 33 is fixed at the same level as the axle 34 on which is pivotally mounted a lever 35, the axle 34 being substantially perpendicular to axle 31. Lever 35 serves to press the abutment 33 against the upper part of the projection 26 on box 21, so as to wedge the supports 25 against the tube 27. The upper part of lever 35 is provided with a plate 36 having a push lock 37 thereon. Plate 36 wedges against the rear wall of box 21, between the wall and member 38 fixed to this wall. For locking, the locking member of the push lock 37 enters into a hole appropriately situated in the rear wall of box 21, in a conventional manner.

FIGS. 4 and 5 show another example of the securement of the load carrying box on the tricycle. In this case, the load carrying box is a tool chest supported on the rear end of the box above the wheels of the box and below the handle of the box. The box 40 with its wheel 41 and its handle 42 has a lid 43 with a handle 44. A tube 46 fixed to chassis 10 supports box 40 which bears against tube 47 also fixed to chassis 10, the supports 45 fixed to box 10 preventing the box from moving backward and thus positioning the box relative to the tubes 46 and 47.

The box 40 has two lugs 48 on opposite sides thereof, which contact plates 49 fixed to chassis 10. Two latches 50 are interconnected by an axle 51 which turns in plates 49. Latches 50 have ramps 52 and notches 53 to receive lugs 48. In FIG. 5, the latches 50 are shown raised for simplicity of representation. Normally, the weight of the latches 50 engages them either with the lugs 54 fixed to the plates 49, or with lugs 48 fixed to the box 40. The ramps 52 and notches 53 permit semiautomatic latching of the box on the tricycle by means of the latches 50. A push lock 55 fixed to one of the latches 50 coacts with hole 56 in one plate 49 to lock the locks 40 on the tricycle by means of a key, again in a conventional manner.

From a consideration of the foregoing disclosure, therefore, it will be evident that the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A tricycle comprising a chassis having a front wheel and two rear wheels, a support (28) carried by said chassis and extending below the axes of the rear wheels, said support having a load locking element (27) thereon, a detachable load carrying box (21) on said support, the axes of the rear wheels intersecting said box, the box having rollers thereon and at least one member (25) engaging with the load locking element (27) to limit forward movement of the box relative to the chassis, a projection (26) on the load carrying box, and a locking device releasably maintaining said member (25) in engagement with the load locking element (27) of the chassis support, said locking device comprising an abutment (33) articulated on the chassis engaging with said projection (26) to press said member (25) of the load carrying box (21) against the load locking element (27), an arm (35) for swinging said abutment, and means (37) for releasably locking said arm on the back of the load carrying box to retain the load carrying box on the tricycle support.

* * * * *